Figure 1:
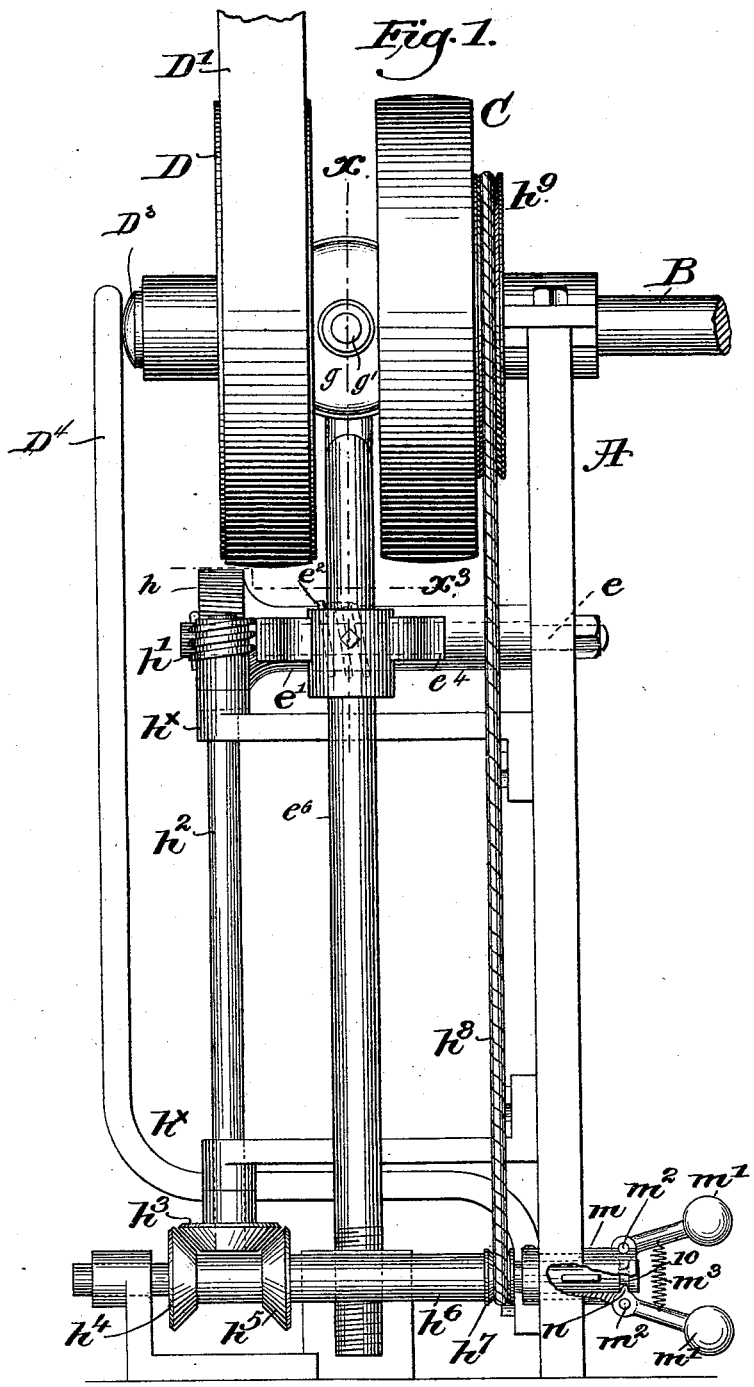

(No Model.)  2 Sheets—Sheet 1.

H. H. CUMMINGS.
SPEED VARYING MECHANISM.

No. 517,443. Patented Apr. 3, 1894.

Witnesses.
Louis N. Gowell
Fred S. Greenleaf

Inventor:
Henry H. Cummings.
by Crosby & Gregory attys.

(No Model.) 2 Sheets—Sheet 2.
H. H. CUMMINGS.
SPEED VARYING MECHANISM.
No. 517,443. Patented Apr. 3, 1894.
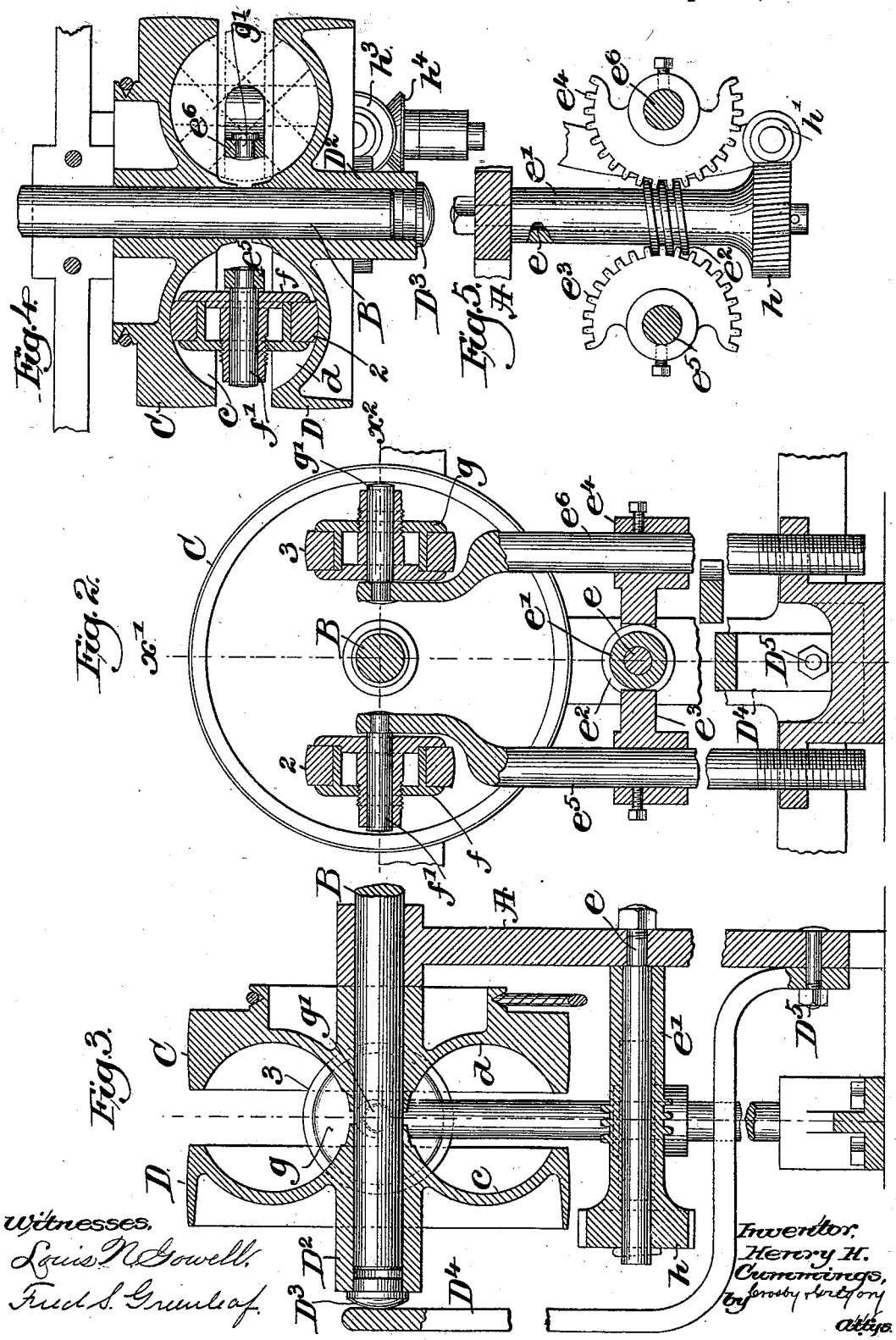

UNITED STATES PATENT OFFICE.

HENRY H. CUMMINGS, OF MALDEN, MASSACHUSETTS.

SPEED-VARYING MECHANISM.

SPECIFICATION forming part of Letters Patent No. 517,443, dated April 3, 1894.

Application filed April 19, 1893. Serial No. 470,938. (No model.)

*To all whom it may concern:*

Be it known that I, HENRY H. CUMMINGS, of Malden, county of Middlesex, State of Massachusetts, have invented an Improvement in Speed-Varying Mechanism, of which the following description, in connection with the accompanying drawings, is a specification, like letters and figures on the drawings representing like parts.

In looms, paper making, spinning, knitting, sewing, and many different kinds of machines for working metals, wood, fibers, &c., and in many mechanical operations or industries, it is frequently desired to vary the speed of a main or cam shaft, and I have devised an improved apparatus for this purpose, which is simple in construction, efficient in operation, and durable.

In accordance with my invention I have provided two pulleys, one being loose to turn about a suitable support, and the other being fast on a shaft, each pulley having at its side next the other pulley an annular chamber or groove circular in cross section, and in connection with such pulleys I have employed one or more intermediate friction rolls, preferably two rolls, one at each side the center of rotation of said shaft to the better distribute working strains and avoid slip, said roll or rolls being so constructed and located as to engage the circularly concaved portions of both said pulleys, said rolls, acted upon and rotated by the loose or driven pulley being borne against and rotating the fast pulley, or the pulley to be rotated, thus rotating with it the shaft which it is to drive, the relative surface speeds of the driving and driven pulley being changed or regulated at will by placing the studs or staples about which the said rolls rotate, at a greater or less angle with relation to the shaft carrying said pulleys, or in other words, the roll or rolls may be so swung as to contact with the said pulleys in their circular grooves at different distances from the centers of rotation of said pulleys, such difference of contact with one or another pulley effectually varying the speed of the driven pulley and shaft with relation to the driving pulley.

I have further improved my invention by adding to the devices referred to a controlling mechanism whereby the speed of the shaft having once been decided upon said speed may be kept at the established rate in case the power used to rotate the driving pulley should vary owing to a greater or less load carried by the prime motor, an engine, or water wheel of any construction.

Figure 1, let it be supposed shows part of a loom frame and a shaft thereof to be rotated, said shaft having my improvements added to it. Fig. 2, is a partial section in the line $x$, Fig. 1; Fig. 3, a section in the line $x'$ at right angles to the section Fig. 2, the shaft being in elevation; Fig. 4, a section on the line $x^2$, Fig. 2; and Fig. 5, a detail below the dotted line $x^3$, Fig. 1.

The frame-work A may be of any suitable shape or character to form bearings for the shaft B. For one illustration of my invention it may be considered that the shaft B is the main or crank shaft of a loom or other machine. The pulley C is supposed to be fast on said shaft and the pulley D loose with relation thereto, the loose pulley being driven by a suitable belt or driver D' driven from any suitable source of motion, and in this embodiment of my invention it will be supposed that the shaft B is to be driven at faster or slower speed, as desired, from the loose driving pulley D, but it might be just the reverse and the shaft B and pulley C be the driver for the loose pulley, without departing from my invention, but I shall describe my invention with the loose pulley as the driving and the fast pulley C as the driven pulley. The sides or portions of the two pulleys C and D next each other are provided each with an annular groove, as $c$ or $d$, the groove in cross section being of such shape as to leave a circular concavity. The frame-work has a suitable stud, as $e$, on which, as herein shown, I have mounted a sleeve $e'$ having a worm $e^2$ which engages preferably the teeth of two gears $e^3$, $e^4$, shown as segmental in shape, the gear $e^3$ being connected to a rod or shaft $e^5$, while the gear $e^4$ is connected to a rod or shaft $e^6$. The rods or shafts $e^5$, $e^6$ are provided respectively with rolls $f$, $g$, mounted, preferably loosely, respectively on studs $f'$, $g'$ of the rods $e^5$, $e^6$. These rolls will preferably have frictional non-metallic tires or peripheries 2, 3 to contact with the circular concavities or bottoms of the annular grooves $c$, $d$. The loose pulley is shown as having a hollow sleeve $D^2$ into which is inserted a plug $D^3$ preferably of wood, said plug having a shoulder to engage the end of the sleeve, the rounded head of the plug being acted upon by an arm $D^4$ fixed to some suitable stationary part, the pressure of the arm on the plug, preferably wood so as to obviate necessity of oil, causing the inner side of pulley D to be pressed against the rolls $f$, $g$, if both are used, said rolls being pressed against the pulley C. When the studs $f'$, $g'$ are exactly at right angles to the shaft B the driven pulley, for instance D, will drive the pulley C at the same speed less any slight amount of slip or loss by friction. By rotating the rods $e^5$, $e^6$ more or less in one or in the other direction so as to put the studs at a greater or less angle to the shaft B the peripheries of the rolls will be moved in the circular concavities, one point of one roll toward the center of one pulley and the opposite point of said roll away from the center of the other pulley, so that one pulley, as D, may, by turning said rods and rolls as described, be made to drive the other at a faster or slower speed than that of its own motion, or the rods may be turned far enough to let the studs stand substantially parallel to the shaft, in which condition the contact between the rolls and pulleys will be broken and the pulley C and the shaft A will be left at rest.

It will be obvious that unless the driven pulley is pressed against the rolls with a force more than sufficient to overcome the load to be moved by the fast pulley, under such conditions the rolls would remain at rest, and in this my invention whenever it is desired to simply stop the machine, all that it is necessary to do is to relax in proper manner pressure upon the driving pulley, increasing such pressure when the driven pulley is to act and rotate the shaft carrying the driving pulley. To turn these rods and rolls in unison, I may rotate the sleeve $e'$ by or through a suitable hand or other wheel, as $h$. I prefer, however, in some instances to so use my invention as to insure a steady uniform rotation for shaft B notwithstanding usual power variations common in mills owing to greater or less work being done by the prime motor of the mill. I have, therefore, made the wheel $h$ as a worm toothed gear to be engaged by a worm $h'$ fast on a suitable shaft $h^2$ having bearings at $h^×$ and having at its lower end a suitable friction wheel or gear as $h^3$ which is adapted to be engaged and rotated by either of the like gears $h^4$, $h^5$ carried by a shaft $h^6$ provided, as shown, with a sleeve or pulley $h^7$, over which is extended a cord or belt $h^8$ which is passed about the sheave $h^9$ fast to the pulley C or moved in unison with it.

The shaft $h^6$ at its outer end has an annular groove, see Fig. 1, which is entered by the short arms of governor levers $m'$, $m'$ pivoted at $m^2$ on pins carried by ears of a tubular shaft or collar $m$ splined to shaft $h^6$ so as to rotate therewith, but the collar cannot slide.

As the shaft $h^6$ is rotated, the governor is also rotated, and when the speed of the shaft B is increased or decreased the governor slides the shaft $h^6$ in one or the other direction and effects the engagement of either the gear $h^4$ or $h^5$ with the gear $h^3$, so as to turn the sleeve $e'$ in one or the other direction according to whether the speed is to be increased or decreased to keep the speed of the shaft B uniform. The governor and its connections going to the sleeve constitute automatic mechanism for varying the speed of the speed regulating devices composed of a roll or rolls, and their supports.

The dotted lines at the right in Fig. 4 show some of the different positions which the intermediate rolls may take in the grooves of the pulleys, so that one pulley rotated at one speed may rotate the other at a different speed.

My device is adapted to vary speed in manner common to cone pulleys. When the two pulleys are in working position the curves of the walls of the grooves $c$ and $d$ fall in parts of a common circle drawn from the center of rotation of the roll, the periphery of which acts against some part of the wall of each groove, and consequently the roll may not only rotate about the stud $g'$, but the stud may also be turned around in the arc of a circle parallel to the longitudinal center of said stud so that the roll may act on any part of the walls of the grooves $c$, $d$, or be moved into or out of said grooves at will.

I may use more than two friction rolls and yet be within my invention, the greater the power to be transmitted by the driven pulley the greater may be the number of rolls.

This invention is not limited to the exact construction shown for the pulleys and rolls shown, nor to the exact construction shown for the devices for supporting and turning said rolls relatively to the said pulleys, nor to the exact form of governor, or to the connections between it and the roll supports.

While I have shown sectors and a worm to turn the rods $e^5$, $e^6$ yet this invention is not limited to the use of sectors and worms as other equivalent devices could be employed and yet be within the gist of my invention. Nor is this invention limited to the use of two rolls, as the use of one would be within the scope of my invention, yet not as desirable as two.

Having described my invention, what I claim, and desire to secure by Letters Patent, is—

1. A driving and driven pulley having circular concavities, an interposed roll entering said concavities, and a support for it, said roll being driven by one of the pulleys and driving the other pulley by friction, combined with a governor, a governor shaft and connections between the governor shaft and the roll support by which the roll is automatically adjusted with relation to the pulleys to insure a constant rotation of the driven pulley at the same rate of speed, substantially as described.

2. A driving and a driven pulley, each having an annular curved-bottom groove in adjacent faces, a shaft for such pulleys, rolls located at different sides of such shaft in frictional contact with the grooves in such pulleys, rotatable supports for such rolls, toothed segments on such supports, a toothed shaft engaging both of said segments to rotate them in unison to vary the relations of the rolls to the centers of the pulleys, a governor, a governor shaft, a connection between the governor shaft and the aforesaid toothed shaft, and an independent connection between the driving pulley and the governor shaft, substantially as described.

3. A driving and a driven pulley each provided with an annular groove semi-circular in cross section substantially as shown, frictional surfaced rolls located between said pulleys and entering said grooves to contact with said pulleys; supports for said rolls, and connections between said supports, combined with a governor, a rotating governor shaft the speed of which is regulated by or with the pulley which is to be run at a constant speed, and connections between said governor shaft and the connecting devices of the said roll supports, whereby any increase or decrease of speed at the driving pulley is automatically made to adjust the rolls with relation to their points of contact with the driving and driven pulleys to insure constant rotation of the driven pulley at the same rate of speed, substantially as described.

In testimony whereof I have signed my name to this specification in the presence of two subscribing witnesses.

HENRY H. CUMMINGS.

Witnesses:
GEO. W. GREGORY,
JOHN C. EDWARDS.